United States Patent
Luo et al.

(10) Patent No.: US 11,115,986 B2
(45) Date of Patent: Sep. 7, 2021

(54) REFERENCE SIGNAL SENDING METHOD AND APPARATUS

(71) Applicant: HUAWEI TECHNOLOGIES CO., LTD., Guangdong (CN)

(72) Inventors: Jun Luo, Kista (SE); Jin Liu, Shenzhen (CN); Pu Yuan, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 70 days.

(21) Appl. No.: 16/579,450

(22) Filed: Sep. 23, 2019

(65) Prior Publication Data
US 2020/0022130 A1    Jan. 16, 2020

Related U.S. Application Data

(63) Continuation of application No. PCT/CN2018/080325, filed on Mar. 23, 2018.

(30) Foreign Application Priority Data

Mar. 24, 2017  (CN) .......................... 201710184904.8

(51) Int. Cl.
*H04W 72/04* (2009.01)
*H04L 5/00* (2006.01)
*H04W 72/00* (2009.01)

(52) U.S. Cl.
CPC ........... *H04W 72/048* (2013.01); *H04L 5/005* (2013.01); *H04L 5/0051* (2013.01); *H04W 72/005* (2013.01)

(58) Field of Classification Search
None
See application file for complete search history.

(56) References Cited

U.S. PATENT DOCUMENTS 10,050,692 B2 * 8/2018 Davydov ................ H04L 5/006
2013/0039284 A1 * 2/2013 Marinier ................ H04L 5/001
                                                          370/329
(Continued)

FOREIGN PATENT DOCUMENTS

CN    101541011 A    9/2009
CN    102438312 A    5/2012
(Continued)

OTHER PUBLICATIONS

Huawei et al: "Analysis and evaluation on RS configuration for RRM measurement of Connected and Idle UEs",3GPP DRAFT; R1-1700403,total 7 pages.

*Primary Examiner* — Otis L Thompson, Jr.
(74) *Attorney, Agent, or Firm* — Womble Bond Dickinson (US) LLP

(57) ABSTRACT

A reference signal sending method and apparatus is disclosed. The method includes the following operations: sending, by a network device, configuration information of a reference signal, where the configuration information of the reference signal is used to indicate air interface sending information of the reference signal; and sending, by the network device, the reference signal based on the configuration information of the reference signal, where the reference signal is a cell specific reference signal, user equipment specific reference signal, or user equipment group specific reference signal. Correspondingly, the embodiments of the present disclosure further disclose a reference signal sending method and apparatus. According to the embodiments of the present disclosure, the network device can flexibly configure the reference signal, and reference signal overheads of the network device can be reduced.

19 Claims, 14 Drawing Sheets

(56) References Cited

U.S. PATENT DOCUMENTS

| | | | |
|---|---|---|---|
| 2013/0083681 A1* | 4/2013 | Ebrahimi Tazeh Mahalleh ......... | H04L 5/0057 370/252 |
| 2015/0230210 A1* | 8/2015 | Lee ...................... | H04L 5/0007 370/329 |
| 2015/0318973 A1 | 11/2015 | Wang et al. | |
| 2016/0344524 A1* | 11/2016 | Kim ...................... | H04L 5/0048 |
| 2019/0029025 A1 | 1/2019 | Pourahmadi et al. | |
| 2020/0228180 A1* | 7/2020 | Zhang ................... | H04L 5/0023 |

FOREIGN PATENT DOCUMENTS

| | | |
|---|---|---|
| CN | 103347298 A | 10/2013 |
| CN | 105122713 A | 12/2015 |
| EP | 2247138 B1 | 7/2014 |
| WO | 2010045288 A2 | 4/2010 |
| WO | 2013067672 A1 | 5/2013 |

* cited by examiner

| CSI-RS sub-frame parameter $I_{CSI-RS}$ | CSI-RS configuration period $T_{CSI-RS}$ (using a sub-frame as a unit) | CSI-RS sub-frame offset $\Delta_{CSI-RS}$ (using a sub-frame as a unit) |
|---|---|---|
| 0 to 4 | 5 | $I_{CSI-RS}$ |
| 5 to 14 | 10 | $I_{CSI-RS} - 5$ |
| 15 to 34 | 20 | $I_{CSI-RS} - 15$ |
| 35 to 74 | 40 | $I_{CSI-RS} - 35$ |
| 75 to 154 | 80 | $I_{CSI-RS} - 75$ |

REFERENCE SIGNAL SENDING METHOD AND APPARATUS

CROSS-REFERENCE TO RELATED APPLICATIONS

This application is a continuation of International Application No. PCT/CN2018/080325, filed on Mar. 23, 2018, which claims priority to Chinese Patent Application No. 201710184904.8, filed on Mar. 24, 2017. The disclosures of the aforementioned applications are hereby incorporated by reference in their entireties.

TECHNICAL FIELD

The present disclosure relates to the communications field, and in particular, to a reference signal sending method and apparatus.

BACKGROUND

Radio resource management (RRM) provides service quality assurance for a wireless user terminal in a network under the condition of a limited bandwidth. A basic goal of RRM is to flexibly allocate and dynamically adjust, when network traffic distribution is non-uniform and a channel feature fluctuates due to channel fading and interference, resources available for a wireless transmission part and a network, to maximize radio spectrum utilization, and prevent network congestion and maintain signaling load as low as possible. The RRM includes power control, channel allocation, scheduling, handover, access control, load control, adaptive code modulation, and the like.

Currently, in a long term evolution (LTE) system, a measurement manner that is based on a downlink reference signal is used for cell handover in the RRM. In other words, a base station sends a reference signal (RS) to user equipment (UE) within a coverage of the base station. Usually, a common reference signal (CRS) on a fixed time-frequency resource is sent. When receiving the CRS sent by the base station, UE performs a measurement based on the CRS, and reports a measurement result to the base station. When receiving the measurement result fed back by the UE, the base station determines, based on the measurement result, whether cell handover needs to be performed for the UE.

In a communication process, the UE may be in a moving state, and may move from a central location of a cell to an edge location of the cell, or from an edge location of a cell to a central location of the cell. However, in these cases, the base station still sends a CRS to the UE, in other words, configuration and sending manners of the base station are fixed, increasing CRS overheads to some extent.

SUMMARY

A technical problem that needs to be resolved in embodiments of the present disclosure is to provide a reference signal sending method and apparatus, so that a network device flexibly configures a reference signal, and reference signal overheads of the network device can be reduced.

According to a first aspect, an embodiment of the present disclosure provides a reference signal sending method, including:

sending, by a network device, configuration information of a reference signal, where the configuration information of the reference signal is used to indicate air interface sending information of the reference signal; and sending, by the network device, the reference signal based on the configuration information of the reference signal, where the reference signal is a cell specific reference signal, user equipment specific reference signal, or user equipment group specific reference signal.

According to a second aspect, an embodiment of the present disclosure provides a reference signal sending apparatus, including:

an information sending unit, configured to send configuration information of a reference signal, where the configuration information of the reference signal is used to indicate air interface sending information of the reference signal; and a signal sending unit, configured to send the reference signal based on the configuration information of the reference signal, where the reference signal is a cell specific reference signal, user equipment specific reference signal, or user equipment group specific reference signal.

According to a third aspect, an embodiment of the present disclosure provides a network device, including a transceiver and a processor, where the transceiver is configured to send configuration information of a reference signal, where the configuration information of the reference signal is used to indicate air interface sending information of the reference signal; and the transceiver is configured to send the reference signal based on the configuration information of the reference signal, where the reference signal is a cell specific reference signal, user equipment specific reference signal, or user equipment group specific reference signal.

In the foregoing three aspects, the reference signal may be a reference signal used for a measurement, or may be a reference signal used for a measurement of mobility between cells or within a cell. Because the network device may configure and send a cell specific reference signal, a user equipment specific reference signal, or a user equipment group specific reference signal, the reference signal overheads of the network device can be reduced when the network device performs the configuration based on a cell level, a user equipment level, or a user equipment group level.

With reference to the foregoing three aspects, in a possible implementation, the reference signal is the cell specific reference signal, and the network device sends configuration information of the cell specific reference signal to all user equipments in a cell to which the network device belongs; or broadcasts configuration information of the cell specific reference signal through a physical broadcast channel (PBCH).

With reference to the foregoing three aspects, in a possible implementation, the reference signal is the user equipment specific reference signal, and the network device sends configuration information of the user equipment specific reference signal, and may send the configuration information of the user equipment specific reference signal by using radio resource control (RRC) signaling.

With reference to the foregoing three aspects, in a possible implementation, when detecting that user equipment is located in a preset edge area, the network device sends the configuration information of the user equipment specific reference signal to the user equipment, and may send the configuration information of the user equipment specific reference signal to the user equipment by using RRC signaling.

With reference to the foregoing three aspects, in a possible implementation, the reference signal is the user equipment group specific reference signal, and the network device sends configuration information of the user equipment group specific reference signal to all user equipments in a user equipment group, and may send the configuration information of the user equipment group specific reference signal to all the user equipments in the user equipment group by using RRC signaling.

With reference to the foregoing three aspects, in a possible implementation, after sending the cell specific reference signal based on the configuration information of the cell specific reference signal, the network device sends configuration information of the user equipment specific reference signal, where the configuration information of the user equipment specific reference signal is used to indicate air interface sending information of the user equipment specific reference signal; and sends the user equipment specific reference signal based on the configuration information of the user equipment specific reference signal. Two layers of configuration and sending are implemented, and the network device flexibly configures the reference signal.

With reference to the foregoing three aspects, in a possible implementation, after sending the cell specific reference signal based on the configuration information of the cell specific reference signal, the network device sends configuration information of the user equipment group specific reference signal, where the configuration information of the user equipment group specific reference signal is used to indicate air interface sending information of the user equipment group specific reference signal; and sends the user equipment group specific reference signal based on the configuration information of the user equipment group specific reference signal. Two layers of configuration and sending are implemented, and the network device flexibly configures the reference signal.

With reference to the foregoing three aspects, in a possible implementation, after first sending the cell specific reference signal based on the configuration information of the cell specific reference signal, and then sending the user equipment group specific reference signal based on the configuration information of the user equipment group specific reference signal, the network device sends the configuration information of the user equipment specific reference signal, where the configuration information of the user equipment specific reference signal is used to indicate air interface sending information of the user equipment specific reference signal; and sends the user equipment specific reference signal based on the configuration information of the user equipment specific reference signal. Three layers of configuration and sending are further implemented, and the network device further flexibly configures the reference signal.

With reference to the foregoing three aspects, in a possible implementation, after sending the user equipment group reference signal based on the configuration information of the user equipment group specific reference signal, the network device sends configuration information of the user equipment specific reference signal, where the configuration information of the user equipment specific reference signal is used to indicate air interface sending information of the user equipment specific reference signal; and sends the user equipment specific reference signal based on the configuration information of the user equipment specific reference signal. Two layers of configuration and sending are implemented, and the network device flexibly configures the reference signal.

According to a fourth aspect, an embodiment of the present disclosure provides a reference signal receiving method, including:

receiving, by user equipment, configuration information of a reference signal, where the configuration information of the reference signal is used to indicate air interface sending information of the reference signal;

receiving, by the user equipment, the reference signal; and performing, by the user equipment, a measurement based on the reference signal, where the reference signal is a cell specific reference signal, user equipment specific reference signal, or user equipment group specific reference signal.

According to a fifth aspect, an embodiment of the present disclosure provides a reference signal receiving apparatus, including:

an information receiving unit, configured to receive configuration information of a reference signal, where the configuration information of the reference signal is used to indicate air interface sending information of the reference signal;

a signal receiving unit, configured to receive the reference signal; and a measurement unit, configured to perform a measurement based on the reference signal, where the reference signal is a cell specific reference signal, user equipment specific reference signal, or user equipment group specific reference signal.

According to a sixth aspect, an embodiment of the present disclosure provides user equipment, including a receiver and a processor, where the transceiver is configured to receive configuration information of a reference signal, where the configuration information of the reference signal is used to indicate air interface sending information of the reference signal;

the transceiver is further configured to receive the reference signal; and the processor is configured to perform a measurement based on the reference signal, where the reference signal is a cell specific reference signal, user equipment specific reference signal, or user equipment group specific reference signal.

According to the fourth aspect to the sixth aspect in the foregoing, the reference signal may be a reference signal used for a measurement, or may be a reference signal used for a measurement of mobility between cells or within a cell. The user equipment performs the measurement based on the cell specific reference signal, the user equipment specific reference signal, or the user equipment group specific reference signal, so that measurement accuracy can be increased.

With reference to the fourth aspect to the sixth aspect in the foregoing, in a possible implementation, after performing the measurement based on the cell specific reference signal, the user equipment receives configuration information of the user equipment specific reference signal, where the configuration information of the user equipment specific reference signal is used to indicate air interface sending information of the user equipment specific reference signal; receives the user equipment specific reference signal; and performs a measurement based on the user equipment specific reference signal.

With reference to the fourth aspect to the sixth aspect in the foregoing, in a possible implementation, after performing the measurement based on the cell specific reference signal, the user equipment receives configuration information of the user equipment group specific reference signal, where the configuration information of the user equipment group specific reference signal is used to indicate air interface sending information of the user equipment group specific reference signal; receives the user equipment group specific reference signal; and performs a measurement based on the user equipment group specific reference signal.

With reference to the fourth aspect to the sixth aspect in the foregoing, in a possible implementation, after first performing the measurement based on the cell specific reference signal, and then performing the measurement based on the user equipment group specific reference signal, the user equipment receives configuration information of the user equipment specific reference signal, where the configuration information of the user equipment specific reference signal is used to indicate air interface sending information of the user equipment specific reference signal; receives the user equipment specific reference signal; and performs a measurement based on the user equipment specific reference signal.

According to a seventh aspect, one embodiment of the present disclosure provides a computer readable storage medium, including an instruction. When the computer readable storage medium is run on a computer, the computer is enabled to perform the reference signal sending method described in the first aspect.

According to an eighth aspect, one embodiment of the present disclosure provides a computer readable storage medium, including an instruction. When the computer readable storage medium is run on a computer, the computer is enabled to perform the reference signal receiving method described in the fourth aspect.

According to the embodiments of the present disclosure, the network device configures and sends the cell specific reference signal, the user equipment specific reference signal, or the user equipment group specific reference signal, so that the base station flexibly configures and sends the reference signal.

BRIEF DESCRIPTION OF DRAWINGS

To describe the technical solutions in the embodiments of the present disclosure or in the background more clearly, the following briefly describes the accompanying drawings required for describing the embodiments of the present disclosure or the background.

DESCRIPTION OF EMBODIMENTS

The following describes embodiments of the present disclosure with reference to the accompanying drawings in the embodiments of the present disclosure.

Figure 1A:
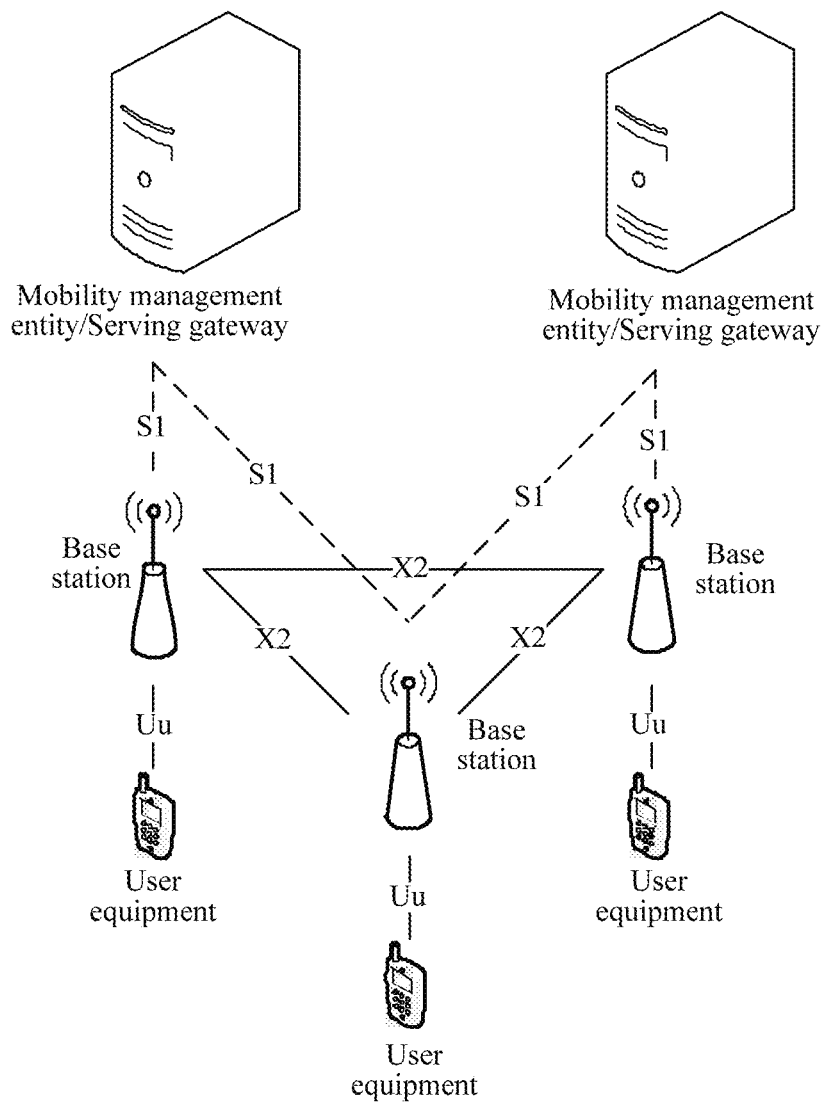
FIG. 1a is a schematic diagram of an example of a network architecture to which an embodiment of the present disclosure may be applied.

FIG. 1a is a schematic diagram of an example of a network architecture to which an embodiment of the present disclosure may be applied. The schematic diagram of the network architecture may show a network architecture of an LTE communications system, or may be an architecture of a universal mobile telecommunications system (UMTS) terrestrial radio access network (UMTS TRAN, UTRAN), or an architecture of a radio access network of a global system for mobile communications (GSM)/enhanced data rates for GSM evolution (EDGE) system (GSM EDGE Radio Access Network, GERAN), or even may be an architecture of a 5th generation (5G) system. The schematic diagram of the network architecture includes a mobility management entity (MME)/serving gateway (SGW), a base station, and user equipment (UE). It should be noted that, quantities and shapes of MMEs/SGWs, base stations, and UEs shown in FIG. 1a are only examples for description, and do not constitute a limitation to this embodiment of the present disclosure.

The MME is a key control node in 3rd generation partnership project (3GPP) LTE, is a network element of a core network, and is mainly responsible for a signaling processing part, namely, a control plane function, including a function such as access control, mobility management, attachment and de-attachment, a session management function, or gateway selection. The SGW is an important network element in the network element of the core network in the 3GPP LTE, and is mainly responsible for a user plane function of user equipment data forwarding, to be specific, performing data packet routing and forwarding under the control of the MME.

The base station is configured to communicate with the user equipment, and may be a base transceiver station (BTS) in a GSM system or code division multiple access (CDMA), or may be a NodeB (NB) in a WCDMA system, or may be an evolved NodeB (eNB) in an LTE system, or even may be a base station in a 5G system or a base station in a future communications system. The base station is mainly responsible for functions on an air interface, such as radio resource management, quality of service (QoS) management, and data compression and encryption. For a core network side, the base station is mainly responsible for forwarding control plane signaling to the MME, and forwarding user plane service data to the SGW.

The user equipment is a device that accesses a network side by using the base station, and may include but is not limited to a cellular phone, a cordless phone, a session initiation protocol (SIP) phone, a wireless local loop (WLL) station, a personal digital assistant (PDA), a handheld device or a computing device having a wireless communication function, another processing device, an in-vehicle device, a wearable device, or the like connected to a wireless modem, or a terminal device in a future 5G network.

An S1 interface shown in FIG. 1a is a standard interface between the base station and the core network. The base station is connected to the MME by using an S1-MME interface, to control signaling transmission. The base station is connected to the SGW by using an S1-U interface, to transmit user equipment data. The S1-MME interface and the S1-U interface are collectively referred to as the S1 interface.

An X2 interface shown in FIG. 1a is a standard interface between base stations, to implement communication between the base stations.

A Uu interface shown in FIG. 1a is a standard interface between the user equipment and the base station, and the user equipment accesses an LTE/5G network by using the Uu interface.

Figure 1B:
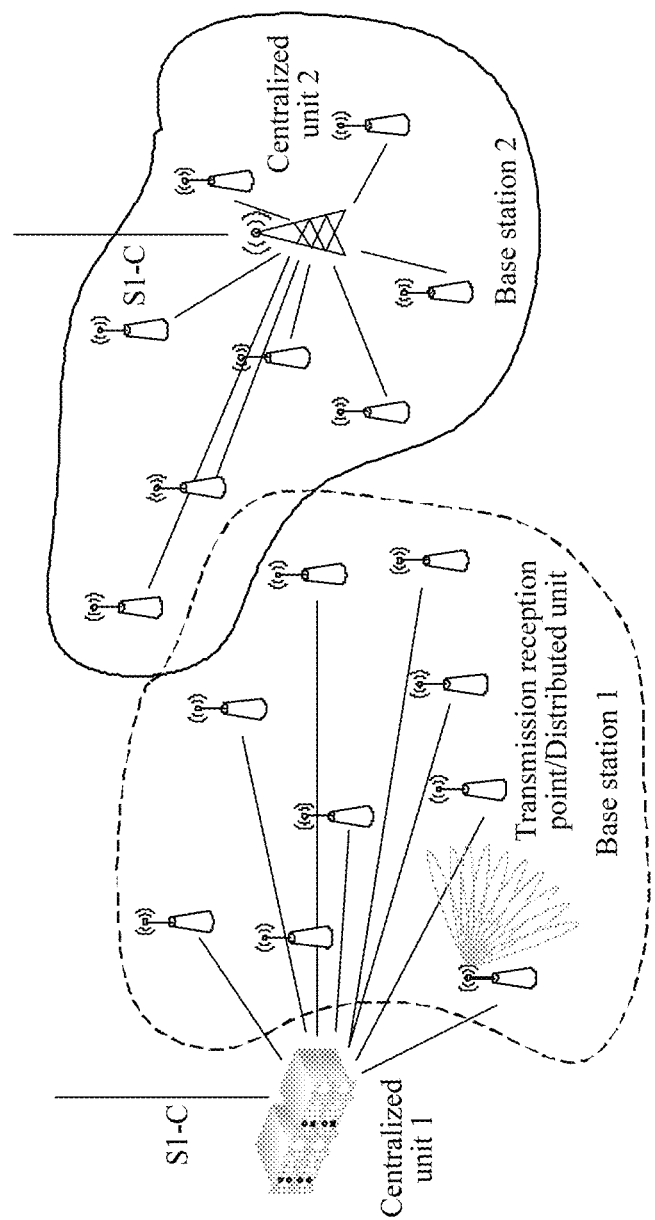
FIG. 1b is a schematic diagram of an example of another network architecture to which an embodiment of the present disclosure may be applied.

FIG. 1b is a schematic diagram of an example of another network architecture to which an embodiment of the present disclosure may be applied. The schematic diagram of the network architecture may be a diagram of a network architecture of new radio (NR) in a next generation wireless communications system. In the schematic diagram of the network architecture, one base station includes one centralized unit (CU) and a plurality of transmission reception points (TRPs)/distributed units (DUs), in other words, a bandwidth based unit (BBU) of the base station is reconstructed as DU and CU functional entities. It should be noted that, shapes and quantities of the centralized unit and the TRPs/DUs shown in FIG. 1b are only examples for description, and do not constitute a limitation to this embodiment of the present disclosure. Centralized units respectively corresponding to a base station 1 and a base station 2 shown in FIG. 1b have different shapes, but respective functions are not affected. It may be understood that, a centralized unit 1 and TRPs/DUs within the dashed line range are composition elements of the base station 1, and a centralized unit 2 and TRPs/DUs within the solid line range are composition elements of the base station 2. The base station 1 and the base station 2 are base stations provided in an NR system.

The CU can process a wireless high-layer protocol stack function, such as a radio resource control (RRC) layer or a packet data convergence protocol (PDCP) layer, and even can allow some core network functions to be deployed at an access network. The access network is also referred to as an edge computing network, and can meet higher network delay requirements of a future communications network for emerging services such as a video, online shopping, and virtual/augmented reality.

The DU mainly processes a physical layer function and a layer 2 function with a higher real-time requirement. Considering a radio remote unit (RRU) and a transmission resource of the DU, some physical layer functions of the DU may be deployed on the RRU, with miniaturization of the RRU, and even more radically, the DU may be combined with the RRU.

The CU may be deployed in a centralized manner. DU deployment depends on an actual network environment. In a core urban area with high traffic density and small station spacing, and in a region with limited equipment room resources, such as a university or a large-scale performance venue, the DU may also be deployed in a centralized manner. In an area with sparse traffic and relatively large station spacing, such as a suburban county or a mountainous area, the DU may be deployed in a distributed manner.

An S1-C interface shown in FIG. 1b is a standard interface between the base station and the core network. A specific device connected by using S1-C is not shown in FIG. 1b.

Based on the schematic diagram of the network architecture shown in FIG. 1a or FIG. 1b, a currently used measurement manner that is based on a downlink signal is: A base station or a TRP sends a CRS to UE within a coverage of the base station or the TRP; when receiving the CRS, the UE performs a measurement based on the CRS, and reports a measurement result to the base station or the TRP; when receiving the measurement result fed back by the UE, the base station or the TRP determines, based on the measurement result, whether cell handover needs to be performed for the UE. Regardless of how the UE moves, the base station or the TRP still sends the CRS to the UE, in other words, configuration and sending manners of the base station or the TRP are fixed, increasing CRS overheads to some extent.

In view of this, the embodiments of the present disclosure provide a reference signal sending method and a reference signal sending apparatus, so that a network device can flexibly configure a reference signal, and reference signal overheads of the network device can be reduced. The reference signal in the embodiments of the present disclosure may be a reference signal used for a measurement, or may be reference signal used for a measurement of mobility between cells or within a cell. Details are not provided again in the embodiments. The following provides descriptions in which the reference signal is a cell specific reference signal, a user equipment specific reference signal, or a user equipment group specific reference signal.

Correspondingly, the embodiments of the present disclosure further provide a reference signal receiving method and a reference signal receiving apparatus, to receive a cell specific reference signal, a user equipment specific reference signal, or a user equipment group specific reference signal, and perform a measurement based on the cell specific reference signal, the user equipment specific reference signal, or the user equipment group specific reference signal, so that accuracy of a measurement result can be increased.

The reference signal sending method and the reference signal sending apparatus, and the reference signal receiving method and the reference signal receiving apparatus provided in the embodiments of the present disclosure may be applied to the schematic diagram of the network architecture shown in FIG. 1a or FIG. 1b. The network device in the embodiments of the present disclosure may a base station shown in FIG. 1a, or may be a TRP/DU shown in FIG. 1b, or may be a combination of a TRP/DU and a CU. The user equipment in the embodiments of the present disclosure may include but is not limited to a cellular phone, a cordless phone, a handheld device or a computing device having a wireless communication function, another processing device, an in-vehicle device, a wearable device, or the like connected to a wireless modem, or a terminal device in a future 5G network. The reference signal sending method and the reference signal receiving method provided in the embodiments of the present disclosure may be applied to a case in which the user equipment is in a connected state.

The following describes in detail the reference signal sending method provided in the embodiments of the present disclosure.

Figure 2A:
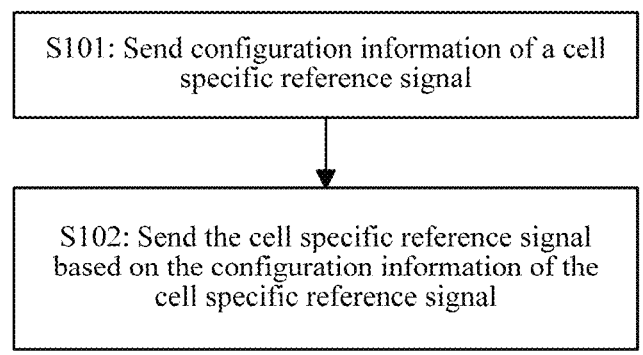
FIG. 2a is a schematic flowchart of a reference signal sending method according to Embodiment 1 of the present disclosure.

FIG. 2a is a schematic flowchart of a reference signal sending method according to Embodiment 1 of the present disclosure. The method includes but is not limited to the following operations.

Operation S101: A network device sends configuration information of a cell specific reference signal.

The configuration information of the cell specific reference signal is used to indicate air interface sending information of the cell specific reference signal. The air interface sending information may include one or more types of information such as a port quantity, a port location, a time-frequency resource mapping rule, a sending period, a time offset, and bandwidth. In other words, the configuration information of the cell specific reference signal indicates ports through which the cell specific reference signal is sent, time-frequency resources occupied by the cell specific reference signal, and time configuration information (such as the sending period and the time offset) of the cell specific reference signal. The port quantity indicates a quantity of occupied ports, such as 1, 2, or 4. The port location indicates occupied ports, such as a port 1 and a port 2. The port quantity and the port location jointly indicate port information for sending the cell specific reference signal.

The cell specific reference signal indicates a cell-based reference signal. A same reference signal is used for each beam for a same cell; or a same configuration is used for a reference signal for a same cell. The cell specific reference signal may be a cell specific channel state information-reference signal (CSI-RS), or may be a measurement reference signal (MRS), or may be a mobility reference signal (MRS), or may be a demodulation reference signal (DM-RS) of a physical broadcast channel (PBCH).

Figures 3, 4:
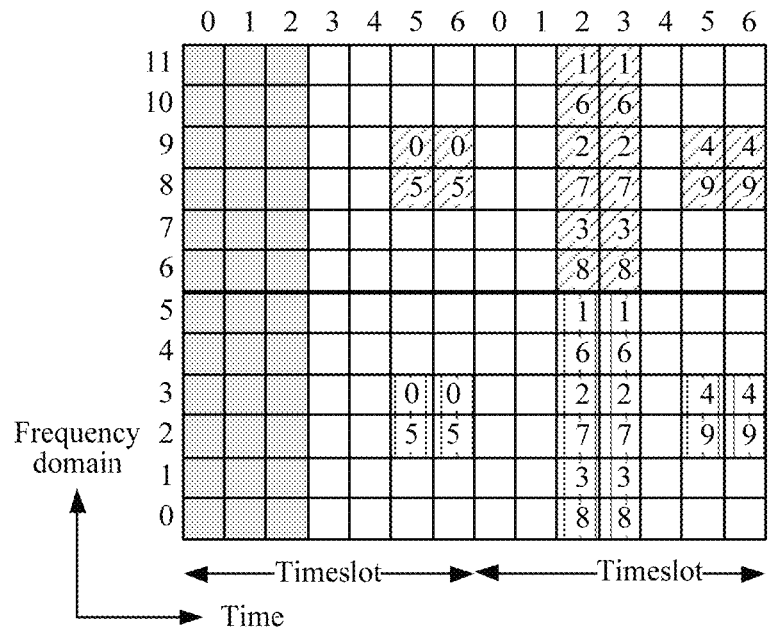
FIG. 3 is a schematic configuration diagram of a time-frequency resource of a channel state information-reference signal for four ports.
FIG. 4 shows a sub-frame configuration table of a channel state information-reference signal.

If the cell specific reference signal is the cell specific CSI-RS, a time-frequency resource configuration status of the cell specific CSI-RS may be shown in FIG. 3 as an example. FIG. 3 is a schematic configuration diagram of a time-frequency resource of a CSI-RS for four ports. A configuration for the cell specific CSI-RS is similar to that for the CSI-RS. In FIG. 3, a horizontal direction indicates a time dimension, one frame, two timeslots, and 14 symbols; and a vertical direction indicates a frequency dimension, and 12 subcarriers. In FIG. 3, three columns shown in a gray shadow area indicate a bandwidth resource allocated for UE, and a part shown in a slash line area or a vertical line area indicates a time-frequency resource occupied for configuring the CSI-RS. For the time configuration information of the cell specific CSI-RS, refer to a CSI-RS sub-frame configuration table shown in FIG. 4. In FIG. 4, a configuration period is a sending period, and a sub-frame offset is a time offset.

The air interface sending information of the cell specific reference signal further includes resource block location information, indicating whether the cell specific reference signal is configured in a synchronization signal block (SS block) or configured in a measurement block. The network device may configure the cell specific reference signal in the SS block or in the measurement block. The measurement block may be a newly defined resource block, and is used for transmitting a reference signal used for a measurement. Certainly, the measurement block may alternatively not be referred to as the measurement block, and may have another name, provided that a function of transmitting the reference signal used for the measurement is included. The network device may configure the cell specific reference signal in one or more SS blocks, or configure the cell specific reference signal in one or more measurement blocks. This depends on a specific situation.

A synchronization signal exists in an SS block. On the contrary, no synchronization signal may exist in a measurement block. In the SS block, in addition to the synchronization signal, another reference signal may be further configured. In the measurement block, a reference signal used for a UE measurement may be configured. For example, time-frequency resource structures of the SS block and the measurement block may be the same as a time-frequency resource structure in an LTE system. In a time dimension, there are 14 symbols, indicating one frame, and there are 12 subcarriers in a frequency dimension. On a time-frequency resource, a quantity of SS blocks and a quantity of measurement blocks are not limited herein.

If the network device configures the cell specific reference signal in an SS block, the network device may not need to inform the UE. For example, it is stipulated by using a standard that, in an SS block, some resources are used for transmitting a reference signal used for synchronization, and some resources are used for transmitting a reference signal used for a measurement. Because the reference signal used for the synchronization is configured in the SS block, the UE needs to perform synchronization based on the reference signal used for the synchronization. If another reference signal is further configured, when obtaining the SS block, the UE may learn that the another reference signal exists. The network device may configure the cell specific reference signal in a measurement block, or further, in one embodiment, may configure another type of reference signal, such as a UE specific reference signal, in a measurement block, or further, in one embodiment, may configure, in a measurement block, a reference signal reference signal used for synchronization.

The network device sends configuration information of the cell specific reference signal to all user equipments in a cell to which the network device belongs; or broadcasts configuration information of the cell specific reference signal, for example, through a PBCH.

If the cell specific reference signal is the cell specific CSI-RS or an MRS, the network device sends configuration information of the cell specific CSI-RS to all the user equipments in the cell to which the network device belongs, or the network device broadcasts configuration information of the cell specific CSI-RS, for example, through the PBCH; or the network device sends configuration information of the MRS to all the user equipments in the cell to which the network device belongs, or the network device broadcasts configuration information of the MRS, for example, through the PBCH. It may be understood that, configuration information of cell specific reference signals for all UEs in a cell to which a TRP belongs is the same.

In one embodiment, the network device sends a pattern index of the cell specific CSI-RS to all the user equipments in the cell to which the network device belongs, or the network device broadcasts a pattern index of the cell specific CSI-RS, for example, through the PBCH. For example, a three-bit pattern index may indicate eight cell specific CSI-RS solutions, and each cell specific CSI-RS solution corresponds to one type of configuration information. For example, when receiving a broadcast message, the UE obtains a pattern index, and measures a cell specific CSI-RS based on a time-frequency resource of a cell specific CSI-RS solution corresponding to the pattern index.

Operation S102: The network device sends the cell specific reference signal based on the configuration information of the cell specific reference signal.

Specifically, the network device sends the cell specific reference signal based on the configuration information of the cell specific reference signal, to be specific, sends the cell specific reference signal based on configured information such as a port, a time-frequency resource mapping rule, and a resource block.

Figure 2B:
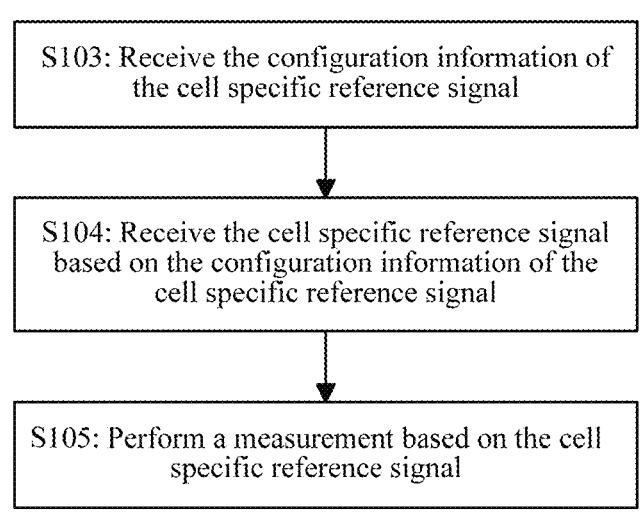
FIG. 2b is a schematic flowchart of a reference signal receiving method according to Embodiment 1 of the present disclosure.

FIG. 2b is a schematic flowchart of a reference signal receiving method according to Embodiment 1 of the present disclosure. Corresponding to the reference signal sending method shown in FIG. 2a, the method includes but is not limited to the following operations.

Operation S103: User equipment receives the configuration information of the cell specific reference signal.

Specifically, the user equipment is any user equipment in the cell to which the network device belongs.

In a possible implementation, the user equipment may receive, by using a broadcast message, the configuration information of the cell specific CSI-RS or the configuration information of the MRS sent by the network device, in other words, the configuration information of the cell specific CSI-RS or the configuration information of the MRS is carried in the broadcast message.

In a possible implementation, the user equipment receives, by using RRC signaling, configuration information of the UE group specific CSI-RS sent by the network device, in other words, the configuration information of the UE group specific CSI-RS is carried in the RRC signaling.

When receiving the configuration information of the cell specific reference signal, the user equipment obtains the configuration information of the cell specific reference signal, to receive the cell specific reference signal.

Operation S104: The user equipment receives the cell specific reference signal based on the configuration information of the cell specific reference signal.

Specifically, the user equipment receives the cell specific reference signal based on the configuration information of the cell specific reference signal. A process of receiving a reference signal may be understood as a process of searching for a building based on a map. The configuration information of the cell specific reference signal is analogical to the map, and the cell specific reference signal is analogical to the building.

Operation S105: The user equipment performs a measurement based on the cell specific reference signal.

Specifically, the user equipment performs the measurement based on the cell specific reference signal in the SS block or the measurement block, to obtain a measurement result. The measurement result may include at least one of results such as reference signal received power (RSRP), reference signal received quality (RSRQ), and a received signal strength indicator (RSSI). A specific measurement method is not limited herein.

According to Embodiment 1 of the present disclosure, the network device configures and sends the cell specific reference signal. Because the configuration of the cell specific reference signal is a configuration that is based on a cell level, reference signal overheads of the network device can be reduced.

Figure 5A:
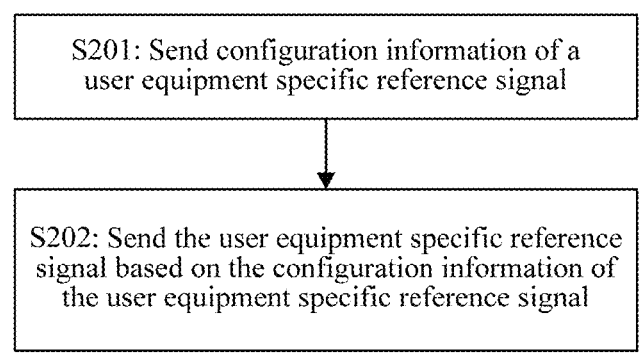
FIG. 5a is a schematic flowchart of a reference signal sending method according to Embodiment 2 of the present disclosure.

FIG. 5a is a schematic flowchart of a reference signal sending method according to Embodiment 2 of the present disclosure. The method includes but is not limited to the following operations.

Operation S201: A network device sends configuration information of a user equipment specific reference signal.

The configuration information of the UE specific reference signal is used to indicate air interface sending information of the UE specific reference signal. The air interface sending information may include one or more types of information such as a port quantity, a port location, a time-frequency resource mapping rule, a sending period, a time offset, and bandwidth. In other words, the configuration information of the UE specific reference signal indicates ports through which the UE specific reference signal is sent, time-frequency resources occupied by the UE specific reference signal, and time configuration information (such as the sending period and the time offset) of the UE specific reference signal. The port quantity indicates a quantity of occupied ports, such as 1, 2, or 4. The port location indicates occupied ports, such as a port 1 and a port 2. The port quantity and the port location jointly indicate port information for sending the UE specific reference signal.

The UE specific reference signal indicates a reference signal that is based on UE. A same reference signal is used for each beam for same UE. The UE specific reference signal may be a CSI-RS, or may be a UE specific CSI-RS.

A time-frequency resource configuration status of the UE specific CSI-RS may be shown in FIG. 3 as an example. FIG. 3 is a schematic configuration diagram of a time-frequency resource of a CSI-RS for four ports. A configuration for the UE specific CSI-RS is similar to that for the CSI-RS. In FIG. 3, a horizontal direction indicates a time dimension, one frame, two timeslots, and 14 symbols; and a vertical direction indicates a frequency dimension, and 12 subcarriers. In FIG. 3, three columns shown in a gray shadow area indicate a bandwidth resource allocated for the UE, and a part shown in a slash line area or a vertical line area indicates a time-frequency resource occupied for configuring the CSI-RS. For the time configuration information of the UE specific CSI-RS, refer to a CSI-RS sub-frame configuration table shown in FIG. 4. In FIG. 4, a configuration period is a sending period, and a sub-frame offset is a time offset.

The air interface sending information of the UE specific reference signal further includes resource block location information, indicating whether the UE specific reference signal is configured in an SS block or configured in a measurement block. The network device may configure the UE specific reference signal in the SS block or in the measurement block. The measurement block may be a newly defined resource block, and is used for transmitting a reference signal used for a measurement. Certainly, the measurement block may alternatively not be referred to as the measurement block, and may have another name, provided that a function of transmitting the reference signal used for the measurement is included. The network device may configure the UE specific reference signal in one or more SS blocks, or configure the UE specific reference signal in one or more measurement blocks. This depends on a specific situation.

If the network device configures the UE specific reference signal in an SS block, the network device may not need to inform the UE. For example, it is stipulated by using a standard that, in an SS block, some resources are used for transmitting a reference signal used for synchronization, and some resources are used for transmitting a reference signal used for a measurement. Because the reference signal used for the synchronization is configured in the SS block, the UE needs to perform synchronization based on the reference signal used for the synchronization. If another reference signal is further configured, when obtaining the SS block, the UE may learn that the another reference signal exists. The network device may configure the UE specific reference signal in a measurement block, or further, in one embodiment, may configure another type of reference signal, such as a cell specific reference signal, in a measurement block, or further, in one embodiment, may configure, in a measurement block, a reference signal reference signal used for synchronization.

The network device may send the configuration information of the UE specific reference signal by using RRC signaling.

In a possible implementation, when detecting that the UE is located in a preset edge area, or when detecting that a movement speed of the UE is less than a threshold, the network device may send the configuration information of the UE specific reference signal to the UE by using the RRC signaling. A specific value of the threshold is not limited herein. A method for the network device to detect whether the UE is located in the preset edge area is not limited herein. For example, the network device may determine, based on a measurement result fed back by the UE based on a synchronization signal, whether the UE is located in the preset edge area, or determine, based on geographical location information of the UE, whether the UE is located in the preset edge area. The preset edge area may be an edge area that is of a base station serving the network device and that is within a coverage of the base station. A distance between the edge area and a central point of the base station exceeds a preset threshold. The preset threshold or a specific size of the preset edge area is set by the network device, and is not limited herein.

In a possible implementation, when the UE does not receive a cell specific reference signal or a synchronization signal, the network device may send configuration information of the UE specific reference signal to the UE by using RRC signaling. The network device may alternatively determine, based on a measurement result fed back by the UE, whether the UE receives the cell specific reference signal. For example, if an RSRP fed back by the UE has relatively large jitter, it may be determined that a UE specific reference signal needs to be configured for the UE.

In a possible implementation, the network device may send, by using RRC signaling, configuration information of the UE specific reference signal to all user equipments in a cell to which the network device belongs. It may be understood that, configuration information of UE specific reference signals for all UEs in a cell to which the network device belongs.

In a possible implementation, the network device may send, by using RRC signaling, configuration information of the UE specific reference signal to all user equipments in a user equipment group. It may be understood that, configuration information of UE specific reference signals for all the user equipments in the user equipment group is the same. The user equipment group is user equipment in a cell to which the network device belongs. All the UEs in the user equipment group have a same group identification (ID) or a group identifier. In a cell, a group identification or a group identifier of a user equipment group may be configured by the network device.

Operation S202: The network device sends the user equipment specific reference signal based on the configuration information of the user equipment specific reference signal.

Specifically, the network device sends the UE specific reference signal based on the configuration information of the UE specific reference signal, to be specific, sends the UE specific reference signal based on configured information such as a port, a time-frequency resource mapping rule, and a resource block.

Figure 5B:
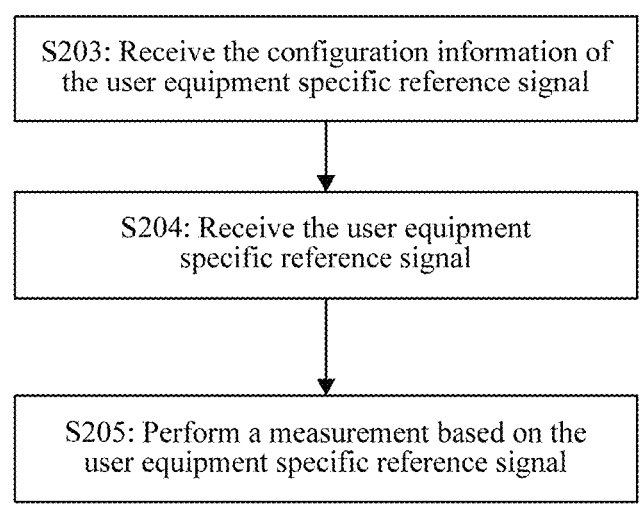
FIG. 5b is a schematic flowchart of a reference signal receiving method according to Embodiment 1 of the present disclosure.

FIG. 5b is a schematic flowchart of a reference signal receiving method according to Embodiment 2 of the present disclosure. Corresponding to the reference signal sending method shown in FIG. 5a, the method includes but is not limited to the following operations.

Operation S203: The user equipment receives the configuration information of the user equipment specific reference signal.

Specifically, the user equipment is any user equipment in the cell to which the network device belongs. The user equipment may receive the configuration information of the UE specific reference signal by using RRC signaling, in other words, the configuration information of the UE specific reference signal is carried in the RRC signaling.

When receiving the configuration information of the UE specific reference signal, the user equipment obtains the configuration information of the UE specific reference signal, to receive the UE specific reference signal.

Operation S204: The user equipment receives the user equipment specific reference signal.

Specifically, the user equipment receives the UE specific reference signal based on the configuration information of the UE specific reference signal.

Operation S205: The user equipment performs a measurement based on the user equipment specific reference signal.

Specifically, the user equipment performs the measurement based on the UE specific reference signal in the SS block or the measurement block, to obtain a measurement result. The measurement result may include at least one of results such as RSRP, RSRQ, and an RSSI. A specific measurement method is not limited herein.

According to Embodiment 2 of the present disclosure, the network device configures and sends the UE specific reference signal. Because the configuration of the UE specific reference signal is a configuration that is based on a UE level, reference signal overheads of the network device can be reduced.

Figure 6A:
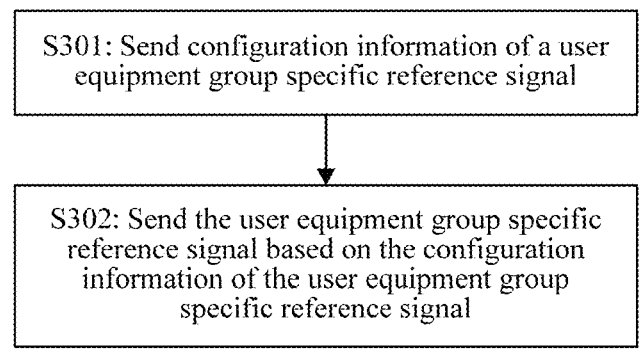
FIG. 6a is a schematic flowchart of a reference signal sending method according to Embodiment 3 of the present disclosure.

FIG. 6a is a schematic flowchart of a reference signal sending method according to Embodiment 3 of the present disclosure. The method includes but is not limited to the following operations.

Operation S301: A network device sends configuration information of a user equipment group specific reference signal.

The configuration information of the UE group specific reference signal is used to indicate air interface sending information of the UE group specific reference signal. The air interface sending information may include one or more types of information such as a port quantity, a port location, a time-frequency resource mapping rule, a sending period, a time offset, and bandwidth. In other words, the configuration information of the UE group specific reference signal indicates ports through which the UE group specific reference signal is sent, time-frequency resources occupied by the UE group specific reference signal, and time configuration information (such as the sending period and the time offset) of the UE group specific reference signal. The port quantity indicates a quantity of occupied ports, such as 1, 2, or 4. The port location indicates occupied ports, such as a port 1 and a port 2. The port quantity and the port location jointly indicate port information for sending the UE group specific reference signal.

The UE group specific reference signal indicates a reference signal that is based on a UE group. A same reference signal is used for each beam for a same UE group. The UE group specific reference signal may be a CSI-RS, or may be a UE group specific CSI-RS.

The air interface sending information of the UE group specific reference signal further includes resource block location information, indicating whether the UE group specific reference signal is configured in an SS block or configured in a measurement block. The network device may configure the UE group specific reference signal in the SS block or in the measurement block.

The network device may send the configuration information of the UE group specific reference signal by using RRC signaling. The network device may send the configuration information of the UE group specific reference signal to all user equipments in a user equipment group by using RRC signaling. It may be understood that, configuration information of UE group specific CSI-RSs for all the UEs in the user equipment group is the same. The user equipment group is user equipment in a cell to which the network device belongs. All the UEs in the user equipment group have a same group ID or a group identifier. For example, the group identifier is "1". In a cell, a group identification or a group identifier of a user equipment group may be configured by the network device.

Operation S302: The network device sends the user equipment group specific reference signal based on the configuration information of the user equipment group specific reference signal.

Specifically, the network device sends the UE group specific reference signal based on the configuration information of the UE group specific reference signal, to be specific, sends the UE group specific reference signal based on configured information such as a port, a time-frequency resource mapping rule, and a resource block.

Figure 6B:
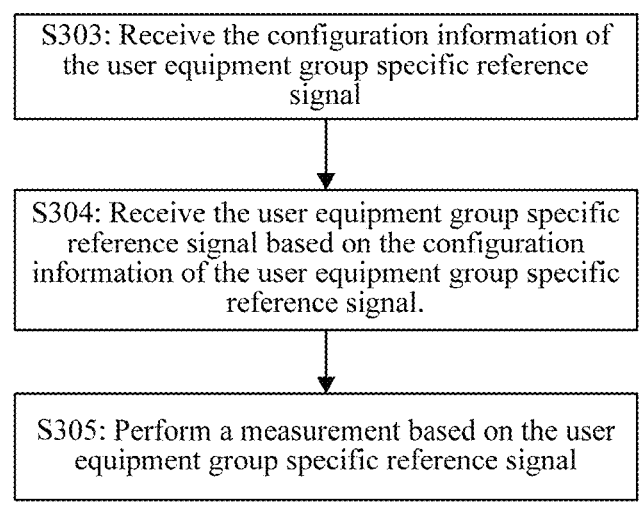
FIG. 6b is a schematic flowchart of a reference signal receiving method according to Embodiment 3 of the present disclosure.

FIG. 6b is a schematic flowchart of a reference signal receiving method according to Embodiment 3 of the present disclosure. Corresponding to the reference signal sending method shown in FIG. 6a, the method includes but is not limited to the following operations.

Operation S303: User equipment receives the configuration information of the user equipment group specific reference signal.

Specifically, the user equipment is any user equipment in the cell to which the network device belongs. The user equipment may receive the configuration information of the UE group specific reference signal by using RRC signaling, in other words, the configuration information of the UE group specific reference signal is carried in the RRC signaling.

Operation S304: The user equipment receives the user equipment group specific reference signal based on the configuration information of the user equipment group specific reference signal.

Specifically, the user equipment receives the UE group specific reference signal based on the configuration information of the UE group specific reference signal.

Operation S305: The user equipment performs a measurement based on the user equipment group specific reference signal.

Specifically, the user equipment performs the measurement based on the UE group specific reference signal in the SS block or the measurement block, to obtain a measurement result. The measurement result may include at least one of results such as RSRP, RSRQ, and an RSSI. A specific measurement method is not limited herein.

According to Embodiment 3 of the present disclosure, the network device configures and sends the UE group specific reference signal. Because the configuration of the UE group specific reference signal is a reference signal configuration that is based on a UE group level, reference signal configuration signaling overheads of the network device can be reduced. The network device configures the UE group specific reference signal, so that the reference signal can be flexibly configured. The UE performs the measurement based on the UE group specific reference signal, so that measurement accuracy can be increased.

Figure 7A:
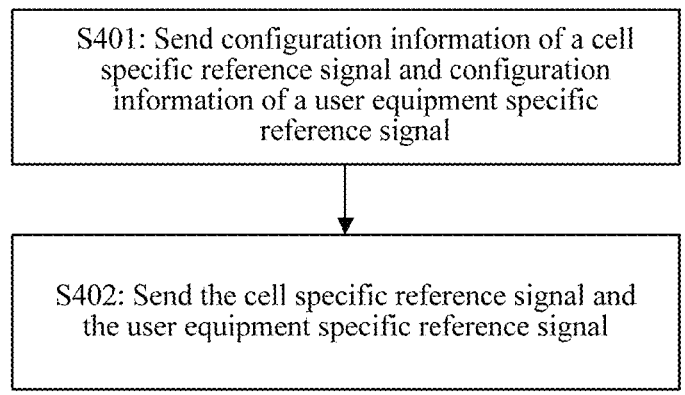
FIG. 7a is a schematic flowchart of a reference signal sending method according to Embodiment 4 of the present disclosure.

FIG. 7a is a schematic flowchart of a reference signal sending method according to Embodiment 4 of the present disclosure. The method includes but is not limited to the following operations.

Operation S401: A network device sends configuration information of a cell specific reference signal and configuration information of a user equipment specific reference signal.

Figure 8A:
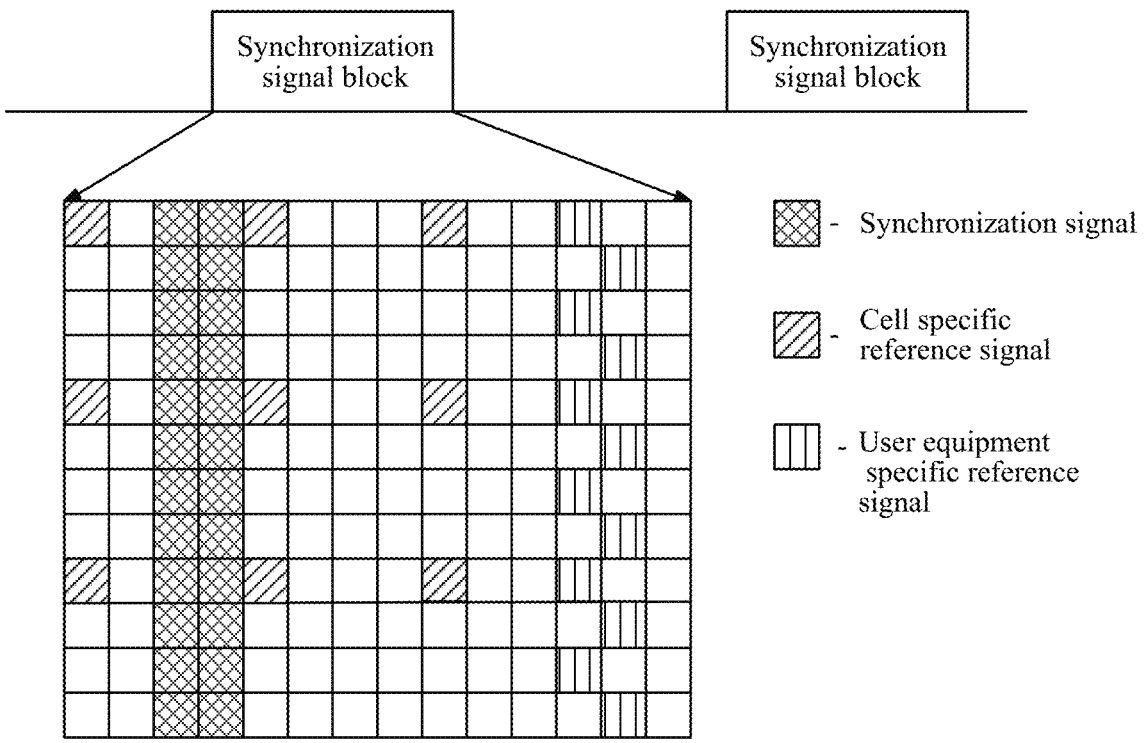
FIG. 8a is a schematic configuration diagram of a time-frequency resource according to an embodiment of the present disclosure.

The network device may configure both the cell specific reference signal and the UE specific reference signal in an SS block. FIG. 8a is a schematic configuration diagram of a time-frequency resource according to an embodiment of the present disclosure. A synchronization signal is represented by using a cross line. A cell specific reference signal is represented by using an oblique line. A UE specific reference signal is represented by using a vertical line.

Figure 8B:
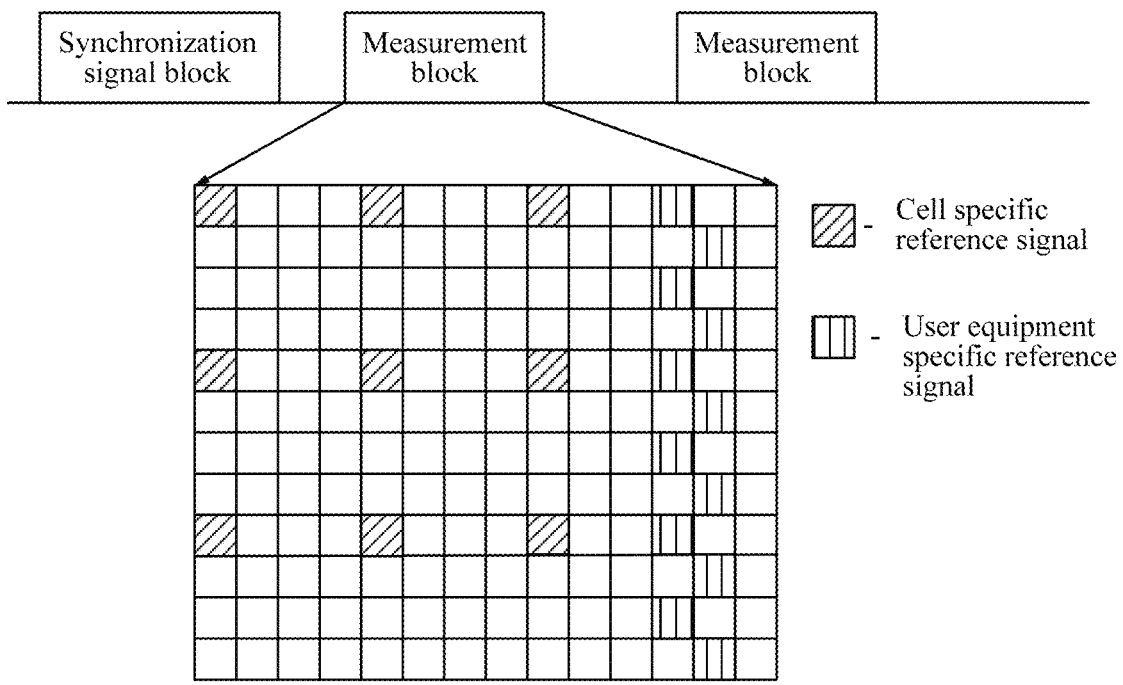
FIG. 8b is another schematic configuration diagram of a time-frequency resource according to an embodiment of the present disclosure.

The network device may configure both the cell specific reference signal and the UE specific reference signal in the measurement block. FIG. 8b is another schematic configuration diagram of a time-frequency resource according to an embodiment of the present disclosure. A cell specific reference signal is represented by using an oblique grid. A UE specific reference signal is represented by using a vertical grid.

Figure 8C:
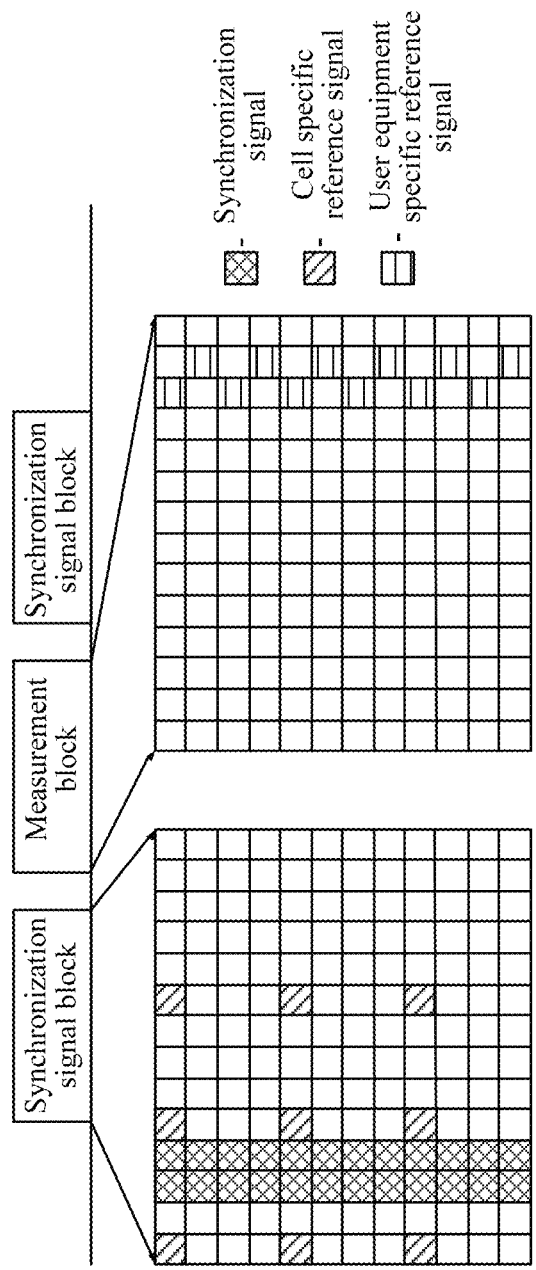
FIG. 8c is still another schematic configuration diagram of a time-frequency resource according to an embodiment of the present disclosure.

The network device may configure the cell specific reference signal in an SS block, and configure the UE specific reference signal in a measurement block. FIG. 8c is still another schematic configuration diagram of a time-frequency resource according to an embodiment of the present disclosure. A synchronization signal is represented by using a cross grid. A cell specific reference signal is represented by using an oblique grid. A UE specific reference signal is represented by using a vertical grid.

Figure 8D:
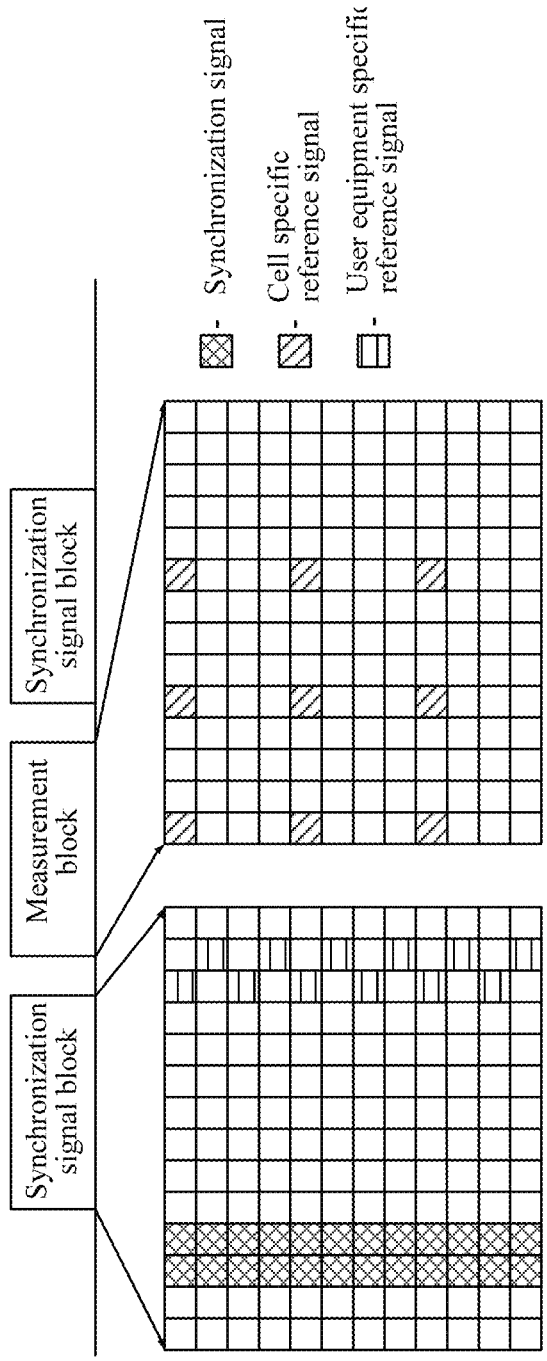
FIG. 8d is still another schematic configuration diagram of still a time-frequency resource according to an embodiment of the present disclosure.

The network device may configure the UE specific reference signal in an SS block, and configure the cell specific reference signal in a measurement block. FIG. 8d is still another schematic configuration diagram of a time-frequency resource according to an embodiment of the present disclosure. A synchronization signal is represented by using a cross grid. A cell specific reference signal is represented by using an oblique grid. A UE specific reference signal is represented by using a vertical grid.

In the cases shown in FIG. 8b to FIG. 8d, the measurement block is introduced, and SS block overheads can be reduced compared with the case shown in FIG. 8a. It should be noted that, in FIG. 8a to FIG. 8d, resource elements (RE) occupied by the synchronization signal, the cell specific reference signal, and the UE specific reference signal do not constitute a limitation to Embodiment 4 of the present disclosure.

For descriptions of the configuration information of the cell specific reference signal, and the configuration information of the UE specific reference signal, respectively refer to the descriptions in Embodiment 1 and Embodiment 2. Details are not described herein again.

The network device may broadcast the configuration information of the cell specific reference signal through the PBCH, and may send the configuration information of the UE specific reference signal by using the RRC signaling.

Operation S402: The network device sends the cell specific reference signal and the user equipment specific reference signal.

Specifically, the network device sends the cell specific reference signal based on the configuration information of the cell specific reference signal, and sends the UE specific reference signal based on the configuration information of the UE specific reference signal.

Figure 7B:
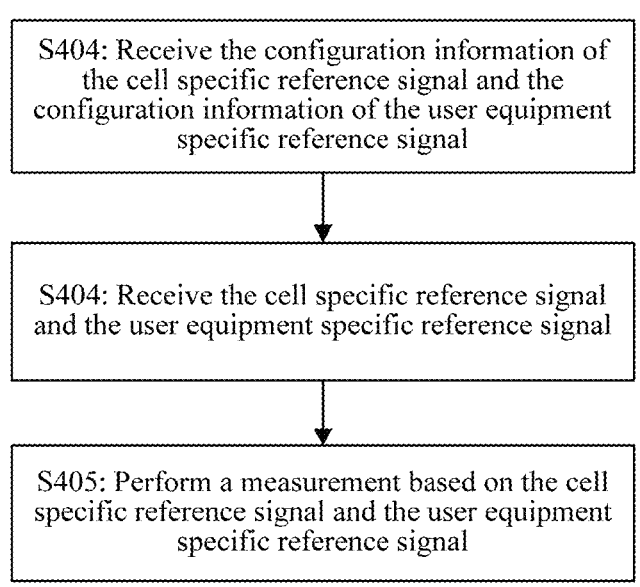
FIG. 7b is a schematic flowchart of a reference signal receiving method according to Embodiment 4 of the present disclosure.

FIG. 7b is a schematic flowchart of a reference signal receiving method according to Embodiment 4 of the present disclosure. Corresponding to the reference signal sending method shown in FIG. 7a, the method includes but is not limited to the following operations.

Operation S403: User equipment receives the configuration information of the cell specific reference signal and the configuration information of the user equipment specific reference signal.

Correspondingly, the user equipment may receive the configuration information of the cell specific reference signal by using a broadcast message, and may receive the configuration information of the UE specific reference signal by using RRC signaling.

Operation S404: The user equipment receives the cell specific reference signal and the user equipment specific reference signal.

Operation S405: The user equipment performs a measurement based on the cell specific reference signal and the user equipment specific reference signal.

Specifically, the user equipment may separately measure the cell specific reference signal and the UE specific reference signal, and may separately report measurement results, or may average measurement results for the separate measurements before reporting, to reduce reporting overheads.

According to Embodiment 4 of the present disclosure, the network device configures and sends the cell specific reference signal and the UE specific reference signal, so that the reference signal is flexibly configured, and the UE measures the cell specific reference signal and the UE specific reference signal, helping increase measurement accuracy.

Figure 9A:
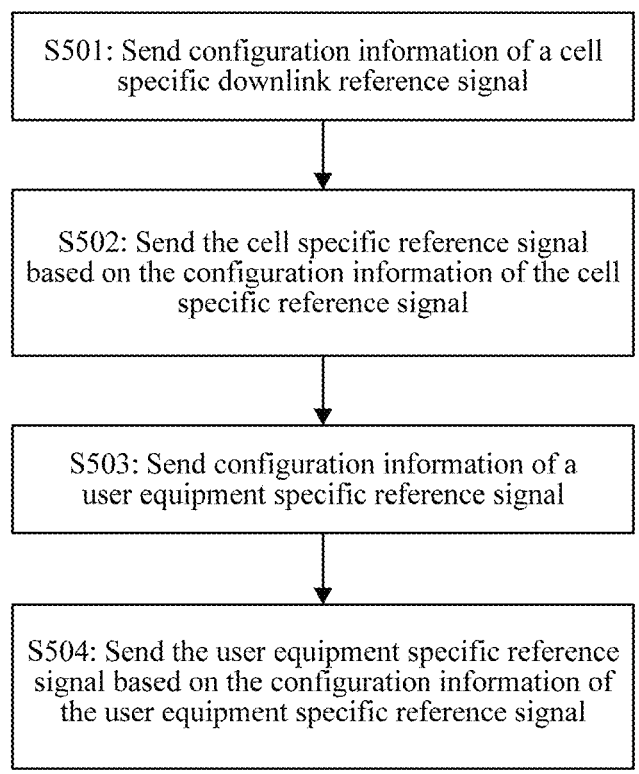
FIG. 9a is a schematic flowchart of a reference signal sending method according to Embodiment 5 of the present disclosure.

FIG. 9a is a schematic flowchart of a reference signal sending method according to Embodiment 5 of the present disclosure. The method includes but is not limited to the following operations.

Operation S501: A network device sends configuration information of a cell specific reference signal.

Operation S502: The network device sends the cell specific reference signal.

In Embodiment 5 of the present disclosure, for a process of implementing operation S501 and operation S502, refer to specific descriptions of operation S101 and operation S102 in Embodiment 1 of the present disclosure. Details are not described herein again.

Operation S503: The network device sends configuration information of a user equipment specific reference signal.

In a possible implementation, when detecting that the UE is located in a preset edge area, or when detecting that a movement speed of the UE is less than a threshold, the network device may send the configuration information of the UE specific reference signal to the UE by using the RRC signaling. A method for the network device to detect whether the UE is located in the preset edge area is not limited herein. For example, the network device may determine, based on a measurement result fed back by the UE based on a synchronization signal, whether the UE is located in the preset edge area, or determine, based on a measurement result fed back by the UE based on a cell specific reference signal or based on geographical location information of the UE, whether the UE is located in the preset edge area. The preset edge area may be an edge area that is of a base station serving the network device and that is within a coverage of the base station. A distance between the edge area and a central point of the base station exceeds a preset threshold. The preset threshold or a specific size of the preset edge area is set by the network device, and is not limited herein.

In a possible implementation, when the UE does not receive a cell specific reference signal, the network device may send configuration information of the UE specific reference signal to the UE by using RRC signaling. The network device may determine, based on a measurement result fed back by the UE, whether the UE receives the cell specific reference signal. For example, if an RSRP fed back by the UE has relatively large jitter, it may be determined that a UE specific reference signal needs to be configured for the UE.

The network device may alternatively send, under another condition, configuration information of the UE specific reference signal to the UE by using RRC signaling. In other words, in Embodiment 5 of the present disclosure, there are a plurality of scenarios in which the network device first sends the configuration information of the cell specific reference signal, and then sends the configuration information of the UE specific reference signal. This is not limited herein.

Operation S504: The network device sends the user equipment specific reference signal.

Figure 9B:
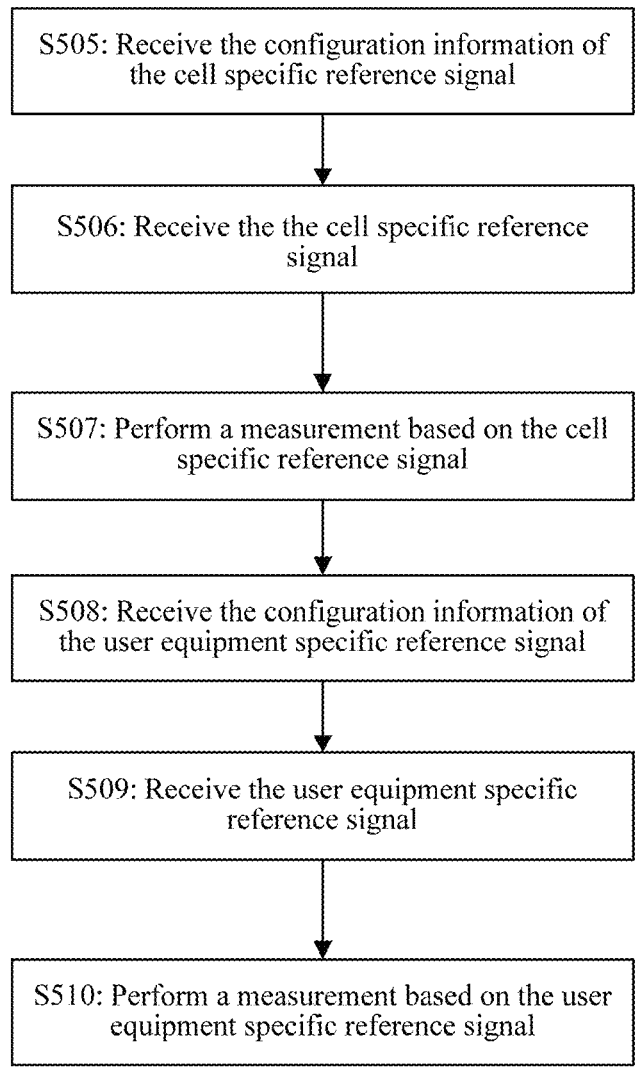
FIG. 9b is a schematic flowchart of a reference signal receiving method according to Embodiment 5 of the present disclosure.

FIG. 9b is a schematic flowchart of a reference signal receiving method according to Embodiment 5 of the present disclosure. Corresponding to the reference signal sending method shown in FIG. 9a, the method includes but is not limited to the following operations.

Operation S505: The user equipment receives the configuration information of the cell specific reference signal.

Operation S506: The user equipment receives the cell specific reference signal.

Operation S507: The user equipment performs a measurement based on the cell specific reference signal.

In Embodiment 5 of the present disclosure, for a process of implementing operation S505 to operation S507, refer to the specific descriptions of operation S103 to operation S105 in Embodiment 1 of the present disclosure. Details are not described herein again.

Operation S508: The user equipment receives the configuration information of the user equipment specific reference signal.

Operation S509: The user equipment receives the user equipment specific reference signal.

Operation S510: The user equipment performs a measurement based on the user equipment specific reference signal.

In Embodiment 5 of the present disclosure, for a process of implementing operation S508 to operation S510, refer to the specific descriptions of operation S303 to operation S205 in Embodiment 2 of the present disclosure. Details are not described herein again.

According to Embodiment 5 of the present disclosure, after configuring and sending the cell specific reference signal, the network device configures and sends the UE specific reference signal. Two layers of configuration and sending are performed, so that the reference signal can be flexibly configured, helping increase measurement accuracy.

It should be noted that, in Embodiment 5 of the present disclosure, the cell specific reference signal is first configured and sent, and then UE specific reference signal is configured and sent. The embodiments of the present disclosure may further provide Embodiment 6 in which a cell specific reference signal is first configured and sent, and then a UE group specific reference signal is configured and sent; and may further provide Embodiment 7 in which a UE group specific reference signal is first configured and sent, and then a UE specific reference signal is configured and sent. Scenarios of Embodiment 6 and Embodiment 7 are not limited herein. The embodiments of the present disclosure may further provide Embodiment 8 in which a cell specific reference signal is first configured and sent, then a UE group specific reference signal is configured and sent, and then a UE specific reference signal is configured and sent. It can be learned that, in Embodiment 5, Embodiment 6, Embodiment 7, and Embodiment 8, the network device can flexibly configure the reference signal.

Figure 10:
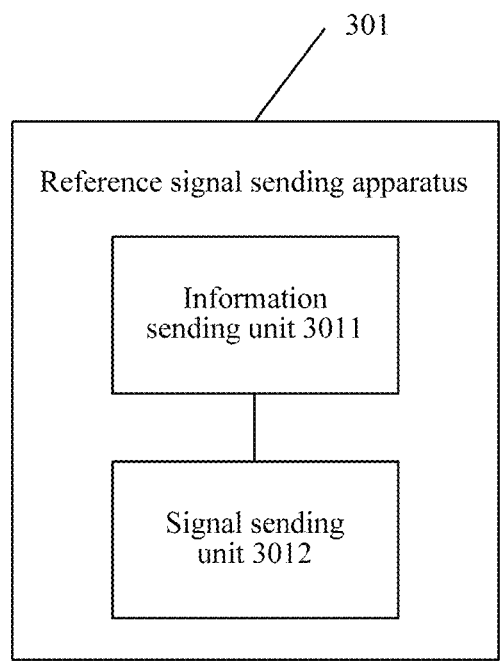
FIG. 10 is a schematic structural diagram of a reference signal sending apparatus according to an embodiment of the present disclosure.

It should be noted that, a reference signal sending apparatus 301 shown in FIG. 10 can implement the embodiments shown in FIG. 2a, FIG. 5a, FIG. 6a, FIG. 7a, and FIG. 9a. An information sending unit 3011 is configured to perform operation S101, operation S201, operation S301, operation S401, operation S501, and operation S503. A signal sending unit 3012 is configured to perform operation S102, operation S202, operation S302, operation S402, operation S502, and operation S504. For example, the reference signal sending apparatus 301 is a base station, or the reference signal sending apparatus 301 may be an application-specific integrated circuit (ASIC), a digital signal processor (DSP), or a chip that implements a related function.

Figure 12:
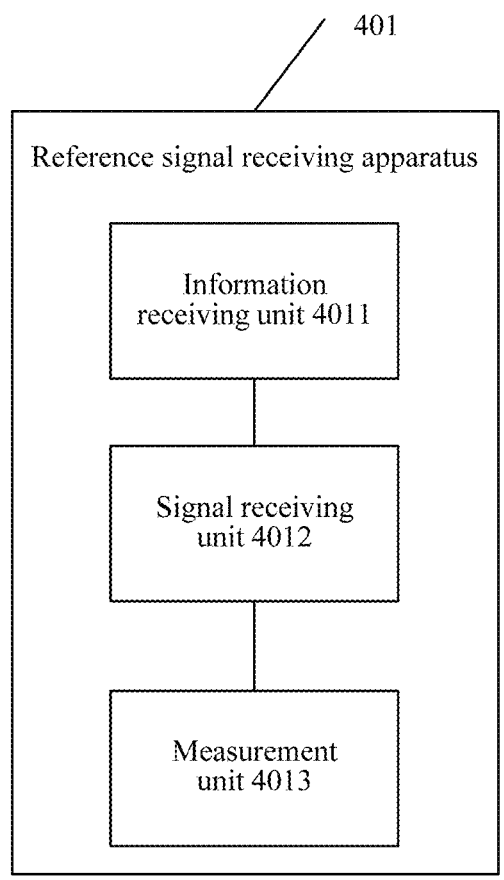
FIG. 12 is a schematic structural diagram of a reference signal receiving apparatus according to an embodiment of the present disclosure.

It should be noted that, a reference signal receiving apparatus 401 shown in FIG. 12 can implement the embodiments shown in FIG. 2b, FIG. 5b, FIG. 6b, FIG. 7b, and FIG. 9b. An information receiving unit 4011 is configured to perform operation S103, operation S203, operation S303, operation S403, operation S505, and operation S508. A signal receiving unit 4012 is configured to perform operation S104, operation S204, operation S304, operation S404, operation S506, and operation S509. A measurement unit 4013 is configured to perform operation S105, operation S205, operation S305, operation S405, operation S507, and operation S510. For example, the reference signal receiving apparatus 401 is UE, or the reference signal receiving apparatus 401 may be an ASIC, a DSP, or a chip that implements a related function.

Figure 11:
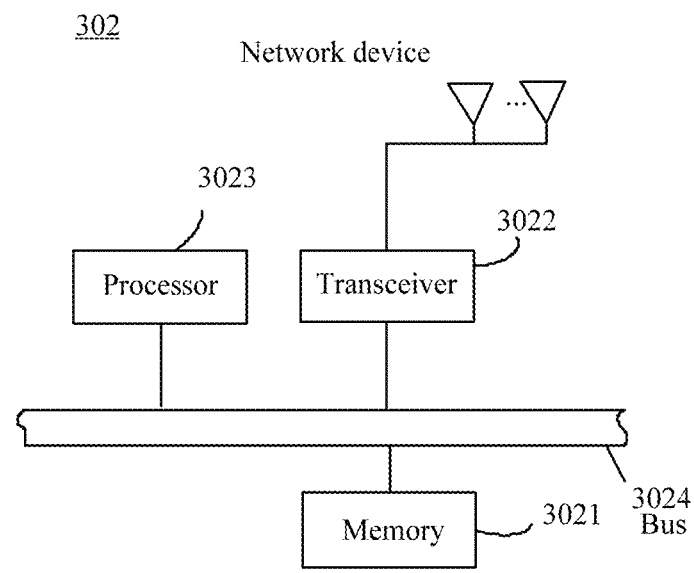
FIG. 11 is a schematic structural diagram of a network device according to an embodiment of the present disclosure.

As shown in FIG. 11, an embodiment of the present disclosure further provides a network device 302. The network device may be a base station, or a DSP, an ASIC, or a chip that implements a related function of resource mapping. The network device 302 includes: a memory 3021, a transceiver 3022, and a processor 3023.

The memory 3021 is configured to store a program. The memory may be a random access memory (RAM), a read only memory (ROM), or a flash memory. The memory may be separately located in a communications device, or may be located in the processor 3023.

The transceiver 3022 may be used as a separate chip, or may be a transceiver circuit in the processor 3023 or used as an input/output interface. The transceiver 3022 is configured to send configuration information of a reference signal. The configuration information of the reference signal is used to indicate air interface sending information of the reference signal. The transceiver 3022 is further configured to send the reference signal based on the configuration information of the reference signal. The reference signal is a cell specific reference signal, a user equipment specific reference signal, or a user equipment group specific reference signal.

The processor 3023 is configured to perform the program stored in the memory.

The transceiver 3021, the memory 3022, and the processor 3023 are connected to each other by using a bus 3024.

It should be noted that, a method performed by the transceiver 3023 is consistent with content described in FIG. 2a, FIG. 5a, FIG. 6a, FIG. 7a, and FIG. 9a. Details are not described again.

Figure 13:
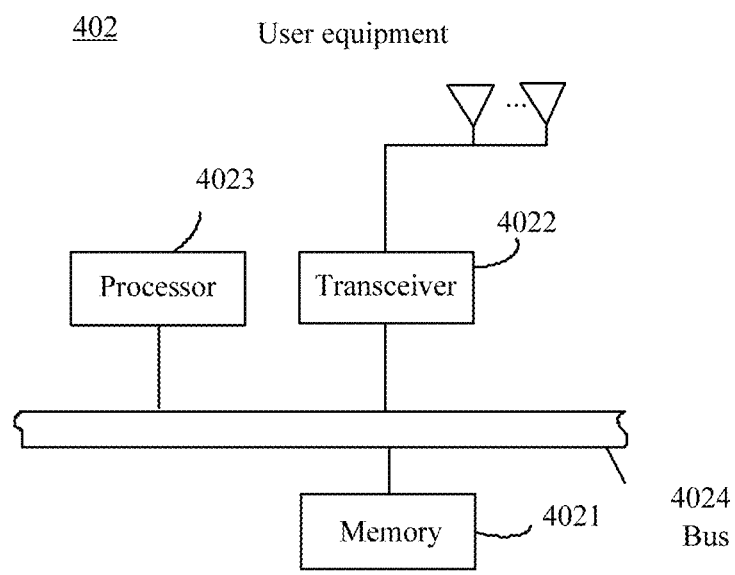
FIG. 13 is a schematic structural diagram of user equipment according to an embodiment of the present disclosure.

As shown in FIG. 13, an embodiment of the present disclosure further provides user equipment 402. The user equipment may be a base station, or a DSP, an ASIC, or a chip that implements a related function of resource mapping. The user equipment 402 includes: a memory 4021, a transceiver 4022, and a processor 4023.

The memory 4021 is configured to store a program. The memory may be a RAM, a ROM, or a flash memory. The memory may be separately located in a communications device, or may be located in the processor 4042.

The transceiver 4022 may be used as a separate chip, or may be a transceiver circuit in the processor 4023 or used as an input/output interface. The transceiver 4022 is configured to receive configuration information of a reference signal. The configuration information of the reference signal is used to indicate air interface sending information of the reference signal. The transceiver 4022 is further configured to receive the reference signal. The reference signal is a cell specific reference signal, a user equipment specific reference signal, or a user equipment group specific reference signal.

It should be noted that, a method performed by the transceiver 4022 is consistent with content described in operation S103, operation S104, operation S203, operation S204, operation S303, operation S304, operation S403, operation S404, operation S505, operation S506, operation S508, and operation S509. Details are not described again.

The processor 4023 is configured to perform the program stored in the memory. When the program is executed, the processor 4023 performs a measurement based on the reference signal.

It should be noted that, a method performed by the processor 4023 is consistent with content described in operation S105, operation S205, operation S305, operation S405, operation S507, and operation S510. Details are not described again.

The transceiver 4021, the memory 4022, and the processor 4023 are connected to each other by using a bus 4024.

An embodiment of the present disclosure further provides a communications system, including the network device in the foregoing network device embodiment and the user equipment in the foregoing user equipment embodiment.

An apparatus in an implementation of the present disclosure may be a field-programmable gate array (FPGA), may be an application-specific integrated circuit (ASIC), may be a system on chip (SoC), may be a central processing unit (CPU), may be a network processor (NP), may be a digital signal processing circuit (e.g., a DSP), may be a microcontroller (e.g., a Micro Controller Unit, MCU), or may be a programmable controller (e.g., a Programmable Logic Device, PLD) or another integrated chip.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again. For ease of brevity, each method embodiment may also be used as mutual reference, and details are not described.

In the several embodiments provided in the present disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the operations of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A reference signal sending method, comprising:
    sending, by a network device, configuration information of a reference signal, wherein the configuration information of the reference signal is used to indicate air interface sending information of the reference signal; and
    sending, by the network device, the reference signal based on the configuration information of the reference signal, wherein
    the reference signal is a cell specific reference signal, user equipment specific reference signal, or user equipment group specific reference signal, wherein if the reference signal is a user equipment specific reference signal, sending configuration information of the user equipment specific reference signal comprises:
    in response to detecting that user equipment is located in a preset edge area, sending, by the network device, the configuration information of the user equipment specific reference signal to the user equipment.

2. The method according to claim 1, wherein the reference signal is the cell specific reference signal; and
    the sending, by a network device, configuration information of a reference signal comprises:
    sending, by the network device, configuration information of the cell specific reference signal to all user equipments in a cell to which the network device belongs; or
    broadcasting, by the network device, configuration information of the cell specific reference signal through a physical broadcast channel (PBCH).

3. The method according to claim 2, wherein after the sending, by the network device, the reference signal based on the configuration information of the reference signal, the method further comprises:
    sending, by the network device, configuration information of the user equipment specific reference signal, wherein the configuration information of the user equipment specific reference signal is used to indicate air interface sending information of the user equipment specific reference signal; and
    sending, by the network device, the user equipment specific reference signal based on the configuration information of the user equipment specific reference signal.

4. The method according to claim 2, wherein after the sending, by the network device, the reference signal based on the configuration information of the reference signal, the method further comprises:
- sending, by the network device, configuration information of the user equipment group specific reference signal, wherein the configuration information of the user equipment group specific reference signal is used to indicate air interface sending information of the user equipment group specific reference signal; and
- sending, by the network device, the user equipment group specific reference signal based on the configuration information of the user equipment group specific reference signal.

5. The method according to claim 4, wherein after the sending, by the network device, the user equipment group specific reference signal based on the configuration information of the user equipment group specific reference signal, the method further comprises:
- sending, by the network device, configuration information of the user equipment specific reference signal, wherein the configuration information of the user equipment specific reference signal is used to indicate air interface sending information of the user equipment specific reference signal; and
- sending, by the network device, the user equipment specific reference signal based on the configuration information of the user equipment specific reference signal.

6. The method according to claim 1, wherein the reference signal is the user equipment specific reference signal; and
the sending, by a network device, configuration information of a reference signal comprises:
- sending, by the network device, configuration information of the user equipment specific reference signal.

7. The method according to claim 1, wherein the sending, by the network device, the configuration information of the user equipment specific reference signal to the user equipment comprises:
- sending, by the network device, the configuration information of the user equipment specific reference signal to the user equipment by using radio resource control (RRC) signaling.

8. The method according to claim 1, wherein the reference signal is the user equipment group specific reference signal; and
the sending, by a network device, configuration information of a reference signal comprises:
- sending, by the network device, configuration information of the user equipment group specific reference signal to all user equipments in a user equipment group.

9. The method according to claim 8, wherein the sending, by the network device, configuration information of the user equipment group specific reference signal to all user equipments in a user equipment group comprises:
- sending, by the network device, the configuration information of the user equipment group specific reference signal to all the user equipments in the user equipment group by using RRC signaling.

10. The method according to claim 8, wherein after the sending, by the network device, the reference signal based on the configuration information of the reference signal, the method further comprises:
- sending, by the network device, configuration information of the user equipment specific reference signal, wherein the configuration information of the user equipment specific reference signal is used to indicate air interface sending information of the user equipment specific reference signal; and
- sending, by the network device, the user equipment specific reference signal based on the configuration information of the user equipment specific reference signal.

11. A reference signal receiving method, comprising:
- receiving, by user equipment, configuration information of a reference signal, wherein the configuration information of the reference signal is used to indicate air interface sending information of the reference signal;
- receiving, by the user equipment, the reference signal;
- performing, by the user equipment, a measurement based on the reference signal, wherein
- the reference signal is a cell specific reference signal, user equipment specific reference signal, or user equipment group specific reference signal; and
- if the reference signal is a user equipment specific reference signal, receiving, by the user equipment, the configuration information of the user equipment specific reference signal in response to determining the user equipment is located in a preset edge area.

12. The method according to claim 11, wherein the reference signal is the cell specific reference signal; and
after the performing, by the user equipment, a measurement based on the reference signal, the method further comprises:
- receiving, by the user equipment, configuration information of the user equipment specific reference signal, wherein the configuration information of the user equipment specific reference signal is used to indicate air interface sending information of the user equipment specific reference signal;
- receiving, by the user equipment, the user equipment specific reference signal; and
- performing, by the user equipment, a measurement based on the user equipment specific reference signal.

13. The method according to claim 11, wherein the reference signal is the cell specific reference signal; and
after the performing, by the user equipment, a measurement based on the reference signal, the method further comprises:
- receiving, by the user equipment, configuration information of the user equipment group specific reference signal, wherein the configuration information of the user equipment group specific reference signal is used to indicate air interface sending information of the user equipment group specific reference signal;
- receiving, by the user equipment, the user equipment group specific reference signal; and
- performing, by the user equipment, a measurement based on the user equipment group specific reference signal.

14. The method according to claim 13, wherein after the receiving, by the user equipment, the user equipment group specific reference signal, the method further comprises:
- receiving, by the user equipment, configuration information of the user equipment specific reference signal, wherein the configuration information of the user equipment specific reference signal is used to indicate air interface sending information of the user equipment specific reference signal;
- receiving, by the user equipment, the user equipment specific reference signal; and
- performing, by the user equipment, a measurement based on the user equipment specific reference signal.

15. The method according to claim 11, wherein the reference signal is the user equipment group specific reference signal; and after the performing, by the user equipment, a measurement based on the reference signal, the method further comprises:

receiving, by the user equipment, configuration information of the user equipment specific reference signal, wherein the configuration information of the user equipment specific reference signal is used to indicate air interface sending information of the user equipment specific reference signal;

receiving, by the user equipment, the user equipment specific reference signal; and performing, by the user equipment, a measurement based on the user equipment specific reference signal.

16. A network device, comprising a transceiver and a processor, wherein the transceiver is configured to send configuration information of a reference signal, wherein the configuration information of the reference signal is used to indicate air interface sending information of the reference signal; and the transceiver is configured to send the reference signal based on the configuration information of the reference signal, wherein the reference signal is a cell specific reference signal, user equipment specific reference signal, or user equipment group specific reference signal, wherein if the reference signal is a user equipment specific reference signal, the transceiver is configured to, in response to detecting that user equipment is located in a preset edge area, send the configuration information of the user equipment specific reference signal to the user equipment.

17. The network device according to claim 16, wherein the reference signal is the cell specific reference signal; and when being configured to send the configuration information of the reference signal, the transceiver is specifically configured to send configuration information of the cell specific reference signal to all user equipments in a cell to which the network device belongs; or specifically configured to broadcast configuration information of the cell specific reference signal through a physical broadcast channel (PBCH).

18. The network device according to claim 16, wherein the reference signal is the user equipment specific reference signal; and when being configured to send the configuration information of the reference signal, the transceiver is specifically configured to send configuration information of the user equipment specific reference signal.

19. The network device according to claim 18, wherein the transceiver is specifically configured to send the configuration information of the user equipment specific reference signal to the user equipment by using radio resource control (RRC) signaling.

* * * * *